(12) United States Patent
Klassen et al.

(10) Patent No.: US 11,175,794 B2
(45) Date of Patent: Nov. 16, 2021

(54) HANDHELD ELECTRONIC DEVICE AND ASSOCIATED METHOD FOR INDICATING DELIVERY STATUS OF A MESSAGE

(71) Applicant: BlackBerry Limited

(72) Inventors: Gerhard D. Klassen, Waterloo (CA); Christopher R. Wormald, Waterloo (CA); Darcy R. Phipps, Waterloo (CA); Craig A. Dunk, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 16/882,172

(22) Filed: May 22, 2020

(65) Prior Publication Data

US 2020/0285373 A1 Sep. 10, 2020

Related U.S. Application Data

(63) Continuation of application No. 16/882,172, filed on Apr. 10, 2019, now Pat. No. 10,664,130, which is a
(Continued)

(51) Int. Cl.
*G06F 3/0481* (2013.01)
*H04L 29/08* (2006.01)
(Continued)

(52) U.S. Cl.
CPC .......... *G06F 3/04817* (2013.01); *H04L 51/04* (2013.01); *H04L 67/24* (2013.01); *H04L 69/24* (2013.01); *H04W 4/16* (2013.01)

(58) Field of Classification Search
CPC ..... G06F 3/04817; H04L 51/04; H04L 67/24; H04L 69/24; H04W 4/16
See application file for complete search history.

(56) References Cited

U.S. PATENT DOCUMENTS

| 5,444,761 A | 8/1995 | Nagashima |
| 5,515,366 A | 5/1996 | Chieu et al. |

(Continued)

FOREIGN PATENT DOCUMENTS

| EP | 1009153 | 6/2000 |
| EP | 1176840 | 1/2002 |

(Continued)

OTHER PUBLICATIONS

Non-Final Office Action dated Dec. 1, 2014, received for U.S. Appl. No. 11/962,145.
(Continued)

*Primary Examiner* — Roland J Casillas
(74) *Attorney, Agent, or Firm* — Fish & Richardson P.C.

(57) ABSTRACT

An improved handheld electronic device and an associated method are provided in which enhanced information regarding an "availability" of a user of a handheld electronic device is provided to another electronic device in a messaging environment. Such availability data provides step-wise indications of the relative availabilities of one or more users of electronic devices in a messaging environment. The step-wise indications can, for instance, range from an availability level of "currently active" to several levels of non-availability. The device and method can be incorporated into an existing messaging environment.

45 Claims, 4 Drawing Sheets

Related U.S. Application Data continuation of application No. 16/380,528, filed on Jan. 20, 2014, now Pat. No. 10,261,654, which is a continuation of application No. 14/159,170, filed on Dec. 21, 2007, now Pat. No. 9,098,169, which is a continuation-in-part of application No. 11/962,145, filed on Sep. 16, 2004, now Pat. No. 7,315,747.

(60) Provisional application No. 60/503,367, filed on Sep. 16, 2003, provisional application No. 60/503,366, filed on Sep. 16, 2003.

(51) Int. Cl.
*H04L 29/06* (2006.01)
*H04L 12/58* (2006.01)
*H04W 4/16* (2009.01)

(56) References Cited

U.S. PATENT DOCUMENTS

| | | | |
|---|---|---|---|
| 5,793,365 | A | 8/1998 | Tang et al. |
| 5,802,460 | A | 9/1998 | Parvulescu et al. |
| 5,960,173 | A | 9/1999 | Tang et al. |
| 6,301,609 | B1 | 10/2001 | Aravamudan et al. |
| 6,317,593 | B1 | 11/2001 | Vossler |
| 6,519,639 | B1 | 2/2003 | Glasser et al. |
| 6,539,421 | B1 * | 3/2003 | Appelman ............ G06Q 10/107 709/206 |
| 6,564,261 | B1 | 5/2003 | Gudjonsson et al. |
| 6,577,859 | B1 | 6/2003 | Zahavi et al. |
| 6,606,309 | B1 | 8/2003 | Wang |
| 7,035,865 | B2 | 4/2006 | Doss |
| 7,139,797 | B1 | 11/2006 | Yaokum et al. |
| 7,236,472 | B2 | 6/2007 | Lazaridis et al. |
| 7,315,747 | B2 | 1/2008 | Klassen et al. |
| 7,911,987 | B2 | 3/2011 | Lazaridis et al. |
| 8,345,601 | B2 | 1/2013 | Lazaridis et al. |
| 2001/0041590 | A1 | 11/2001 | Silberfenig et al. |
| 2002/0075303 | A1 | 6/2002 | Thompson et al. |
| 2002/0087649 | A1 | 7/2002 | Horvitz |
| 2002/0126146 | A1 * | 9/2002 | Burns ................. G06F 3/0482 715/752 |
| 2002/0128036 | A1 | 9/2002 | Yach et al. |
| 2002/0143916 | A1 | 10/2002 | Mendiola et al. |
| 2003/0013467 | A1 | 1/2003 | Caloud |
| 2003/0018726 | A1 | 1/2003 | Low et al. |
| 2003/0065721 | A1 | 4/2003 | Roskind |
| 2003/0126213 | A1 | 7/2003 | Betzler |
| 2003/0217098 | A1 | 11/2003 | Bobde et al. |
| 2004/0162877 | A1 * | 8/2004 | Van Dok ............... G06F 3/0481 709/204 |
| 2004/0170263 | A1 | 9/2004 | Michael et al. |
| 2005/0027716 | A1 | 2/2005 | Apfel |
| 2006/0101266 | A1 | 5/2006 | Klassen et al. |
| 2007/0042815 | A1 | 2/2007 | Trap |
| 2008/0261636 | A1 | 10/2008 | Lau et al. |

FOREIGN PATENT DOCUMENTS

| | | |
|---|---|---|
| EP | 1233570 | 8/2002 |
| EP | 1331786 | 7/2003 |
| EP | 1385323 | 1/2004 |
| WO | 9912365 | 3/1999 |
| WO | 02065250 | 8/2002 |
| WO | 03034672 | 4/2003 |
| WO | 03058908 | 7/2003 |

OTHER PUBLICATIONS

Hiroyuki, et al.; "Webhint: An Automatic Configuration Mechanism for Optimizing World Wide Web Cache System Utilization"; Proceedings of the 1998 Internet Society Conference (INET '98); Jul. 21, 1988.

Squid Developers; "Squid Programmers Guide"; Internet article [online] Aug. 11, 2004; retrieved on Aug. 1, 2006 from http://www.squid-cache.org/Doc/Prog-Guide/ (copy of archive attached).

Vetter, B. et al.: "An Experimental Study of Insider Attacks for the OSPF Routing Protocol"; 1997; pp. 1 to 17; ICN 1997.

Acampora, A.S. et al.; "Control and Quality-of-Service Provisioning in High-Speed Microcellular Networks"; IEEE Personal Communications Magazine; 1994; vol. 1, No. 2. 1994.

Tanambaum, A.; Computer Networks (Fourth Edition); Jan. 1, 2003; p. 7; ISBN: 978-0-13-038488.

Lastoria, G.; Supplemental Search Report from the European Application No. 047641845.9; dated Aug. 22, 2006.

Lastoria, G.; Supplemental Search Report from the European Application No. 047641846.7; dated Aug. 24, 2006.

Lastoria, G.; Search Report from the European Application No. 047641847.5; dated Oct. 11, 2009, 2006.

Lastoria, G.; Search Report from the European Application No. 08166369.2; dated Mar. 12, 2009.

Lastoria, G.; Search Report from the European Application No. 10156600.8; dated Apr. 20, 2010.

Lastoria, G.; Search Report from the European Application No. 10178664.8; dated Oct. 14, 2010.

Lastoria, G.; Search Report from the European Application No. 10184719.2; dated Nov. 24, 2010.

* cited by examiner

|  | | | |
|---|---|---|---|
| Quick Messaging: 'Available' <sub>76</sub> <sub>78</sub> | | | 12:30 PM |
| — ONLINE (25 TOTAL) | Availability | | Last Msg |
| 84 ✓ Tom Jones | -available | 96 | 06:50 pm |
| 88 ☎ Bud Auto —80 | -on the phone | | 11:20 am |
| 84 ⧗ Evil Knievel —80 | -idle —96 | | Yesterday |
| 88 ✓ Madonna —80 | -available —96 | | 11:30 am |
| 84 | | | |
| 88 🖨 Mr Smith | -currently typing | | 4 minutes |
| 👤 Harry Smith | -in meeting | | 09:30 am |
| ? Bert Smith | -ignoring data | | 10:35 am |
| ✓D Mike Ham | -data delivered | | 12:23 pm |
| ✓R My Wife | -data read | | 12:29 pm |
| 📧 My boss | -unread data | | 12:30 pm |
| 84 🚫 Friend A | -turned off | | 09:40 am |
| 88 🚫QM Friend B | -Blocked QM —96 | | Yesterday |

HANDHELD ELECTRONIC DEVICE AND ASSOCIATED METHOD FOR INDICATING DELIVERY STATUS OF A MESSAGE

This application is a continuation of U.S. patent application Ser. No. 16/380,528 filed on Apr. 10, 2019, and issued as U.S. Pat. No. 10,664,130 on May 26, 2020, which is a continuation of U.S. patent application Ser. No. 14/159,170 filed on Jan. 20, 2014, and issued as U.S. Pat. No. 10,261, 654 on Apr. 16, 2019, which is a continuation of U.S. patent application Ser. No. 11/962,145 filed on Dec. 21, 2007, and issued as U.S. Pat. No. 9,098,169 on Aug. 4, 2015, which is a continuation-in-part of U.S. Patent Application Ser. No. 10/942,305 filed on Sep. 16, 2004, and issued as U.S. Pat. No. 7,315,747 on Jan. 1, 2008, which claims benefit of 60/503,367 filed on Sep. 16, 2003, and claims benefit of 60/503,366 filed on Sep. 16, 2003, all of which are herein incorporated by reference.

BACKGROUND OF THE INVENTION

Field of the Invention

The invention relates generally to handheld electronic devices and, more particularly, to a handheld electronic device and a method and protocol for providing information representative of an availability of a user in a messaging environment.

Background of the Invention

Numerous types of handheld electronic devices are known. Examples of such handheld electronic devices include, for instance, personal data assistants (PDAs), handheld computers, two-way pagers, cellular telephones, and the like. Such handheld electronic devices are generally intended to be portable, and thus are relatively small. Many handheld electronic devices also feature wireless communication capability, although many such handheld electronic devices are stand-alone devices that are functional without communication with other devices. With advances in technology, handheld electronic devices are being configured to include greater numbers of features while having relatively smaller form factors.

Electronic devices, including handheld electronic devices, are capable of numerous types of communication. One type of communication is "messaging", and one type of messaging is "instant messaging" which enables a first device to send a message to a second device. Many instant messaging services, both public and private, are available today. With most all instant messaging services, a given electronic device is provided with an interface that identifies various other electronic devices with which the given electronic device can communicate. If one of the other electronic devices has been logged out of the instant messaging service or has been switched off, the interface typically will identify the "presence" of such electronic device as being "unavailable". Otherwise, the other electronic devices are listed as having a "presence" of "available" unless a user of one of the other electronic devices has manually changed his or her presence to a different setting, such as "out to lunch". While instant messaging protocols and devices using the protocols have been generally effective for their intended purposes, such instant messaging protocols and devices have not been without limitation.

Generally, all instant messaging services employ protocols that were written for desktop devices, i.e., devices that generally are not portable. In an environment that includes handheld electronic devices, i.e., devices that are portable and generally remain switched on, the old protocol presence designations of "available" and "unavailable" are imprecise since such a handheld electronic device is nearly always listed as "available", even late at night when a user clearly is not available, say, for instant messaging. Such an imprecise indication of a user's availability is generally undesirable in a messaging environment since it is generally desired that a recipient of a message be available to read and respond to the message. The communication of messages to an unavailable user wastes the time of the sender of the messages and also wastes communication bandwidth. It thus would be desirable to provide an improved method and apparatus for providing more accurate information regarding the availability of a user of a handheld electronic device in a messaging environment. Such an improved method and apparatus desirably might be capable of use with existing instant messaging services.

SUMMARY OF THE INVENTION

An improved handheld electronic device and an associated method are provided in which enhanced information regarding an "availability" of a user of a handheld electronic device is provided to another electronic device in a messaging environment. Such availability data provides stepwise indications of the relative availabilities of one or more users of electronic devices in a messaging environment. The step-wise indications can, for instance, range from an availability level of "currently active" to several levels of non-availability. The device and method can be incorporated into an existing messaging environment.

Accordingly, an aspect of the invention is to provide an improved handheld electronic device, a messaging method, and a protocol in which a relatively descriptive indication of a user's availability in a messaging environment is provided to other users in the environment.

Another aspect of the invention is to provide an improved method of helping users of a messaging service to communicate with other users by having an awareness of the relative availabilities of the other users of handheld electronic devices for messaging.

Another aspect of the invention is to provide an improved method of helping users of a messaging service to reduce the amount of time that otherwise is wasted in attempting to communicate with other users of the messaging service by providing an indication as to whether or not the other users are likely to respond to messages.

Another aspect of the invention is to provide an improved method of reducing wasted bandwidth in a messaging environment by reducing the number of sent messages that are unlikely to receive a response from another user.

Another aspect of the invention is to provide an improved handheld electronic device, a messaging method, and a protocol in which a relatively descriptive indication of a user's availability in a messaging environment is provided to other users in the environment and that can be incorporated, at least in part, into an existing messaging service.

Accordingly, an aspect of the invention is to provide an improved method of enabling communication of enhancement data between a first device and a second device, with the first device being a handheld electronic device having a wireless communication capability, and with the second device being an electronic device. The first device and the second device are capable of communication with one another in a first communications band. The general nature of the method can be stated as including enabling a communication between the first device and the second device in a second communications band, and enabling a transmission of enhancement data between the first device and the second device in the second communications band.

Another aspect of the invention is to provide an improved method of enabling communication of enhancement data between a first device and a second device, with the first device being a handheld electronic device having a wireless communication capability, and with the second device being an electronic device. The general nature of the method can be stated as including enabling a communication between the first device and the second device, enabling a determination responsive to said communication that the first device and the second device are capable of communicating enhancement data, and enabling a transmission of enhancement data between the first device and the second device.

BRIEF DESCRIPTION OF THE DRAWINGS

A full understanding of the invention can be gained from the following Description of the Preferred Embodiment when read in conjunction with the accompanying drawings in which.

Similar numerals refer to similar parts to the specification.

DESCRIPTION OF THE PREFERRED EMBODIMENT

Figure 1:
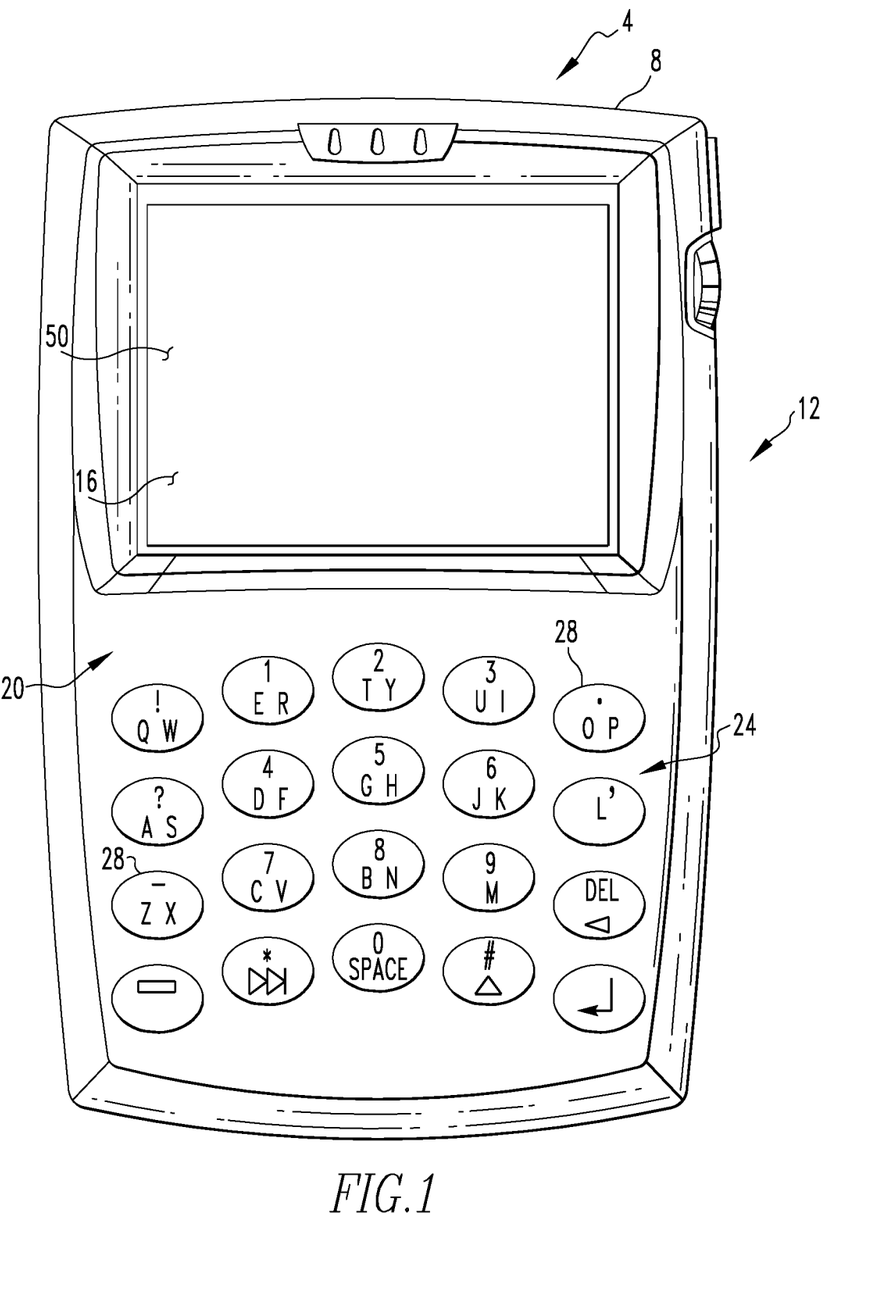
FIG. 1 is an exemplary top plan view of a handheld electronic device in accordance with the invention which can be used in conjunction with an improved method in accordance with the invention.
Figure 2:
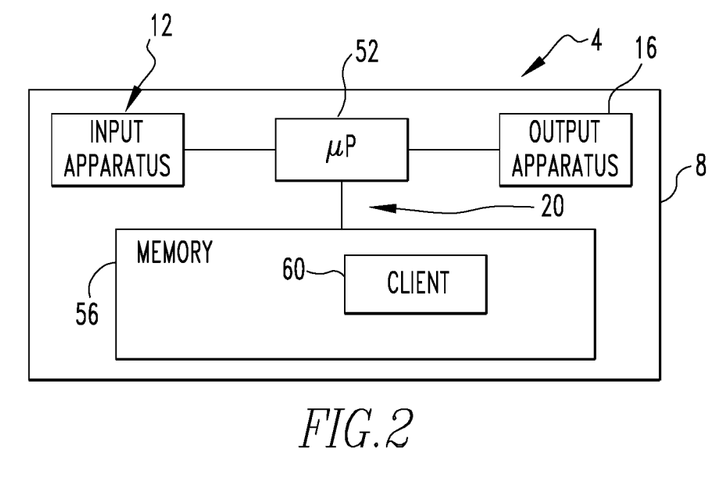
FIG. 2 is a schematic view of the handheld electronic device of FIG. 1.

An improved handheld electronic device 4 in accordance with the invention is indicated generally in FIG. 1 and is depicted schematically in FIG. 2. The exemplary handheld electronic device 4 includes a housing 8 upon which are disposed an input apparatus 12, an output apparatus 16 and a processor apparatus 20. The input apparatus 12 includes a keypad 24 that can be said to include a plurality of keys 28.

The output apparatus 16 includes a display 50. The output apparatus 16 can additionally include, for instance, additional indicators such as lights, and the like, and can additionally include an audible output such as a speaker as well as other output devices.

The processor apparatus 20 includes a processor 52 that can be, for instance, and without limitation, a microprocessor (μP), and it is responsive to inputs from the input apparatus 12 and provides output signals to the output apparatus 16. The processor apparatus 20 further includes a memory 56 that includes a client 60 stored therein. The exemplary client 60 is a messaging routine that can provide a messaging capability on the device 4. It is understood that the memory 56 likely includes a number of other routines that are not expressly mentioned herein. As employed herein, the expression "a number of" and variations thereof shall refer broadly to any nonzero quantity including a quantity of one. The processor 52 interfaces with the memory 56, and the client 60 is executable on the processor 52. A more detailed discussion of the generation and provision of availability information is provided in commonly owned U.S. patent application Ser. Nos. 10/942,749 and 10/942,167 filed on Sep. 16, 2004, entitled "Handheld Electronic Device and Associated Method Providing Availability Data in a Messaging Environment"; and entitled "A Method For Creating A Peer-To-Peer Immediate Messaging Solution Without Using An Instant Messaging Server", the disclosures of which are hereby incorporated into the present application by reference.

Figure 3:
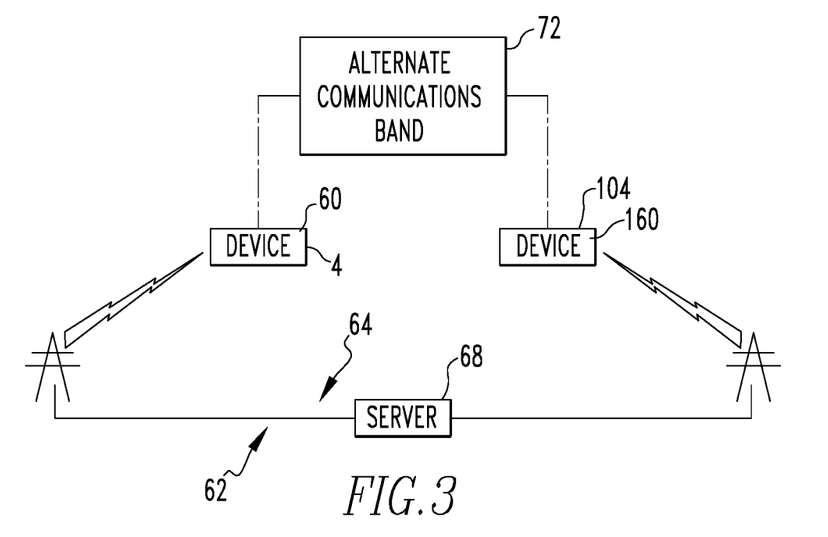
FIG. 3 is a schematic view of the handheld electronic device of FIG. 1 and another device in a messaging environment.

The device 4 further includes a wireless communication system. As can be seen in FIG. 3, the device 4 and, more specifically, the client 60 can interface with a messaging service 62 to wirelessly provide the messaging capability on the device 4. In the depicted exemplary embodiment, the messaging service 62 provides an instant messaging capability on the device 4 and on the other electronic devices having clients that are subscribers to the messaging service 62. The messaging service 62 is schematically depicted as including a server 68 and as providing communication within a first communication band 64. The first communication band 64 can generally be said to include the preexisting protocol of the messaging service 62 as transmitted through the predetermined communication bandwidth through which the messaging service 62 is provided to its subscribers.

FIG. 3 further depicts another device 104 as being a device having a client that is another subscriber to the messaging service 62. Specifically, the device 104 is an electronic device having a client 160 thereon which can communicate with the messaging service 62 to provide a messaging capability on the device 104. While the exemplary device 104 is depicted as having a wireless connection with the messaging service 62, it is understood that the device 104 may employ a non-wireless communication capability and still not depart from the concept of the invention. It is further understood that while only the two devices 4 and 104 are depicted in FIG. 3 as being subscribers to the messaging service 62, many more subscribers to the messaging service 62 exist but are not expressly depicted in FIG. 3.

In accordance with an aspect of the improved method of the invention, the protocol of the messaging service 62, as provided on the devices 4 and 104 by the clients 60 and 160, respectively, provides to users of the devices 4 and 104 enhanced data regarding the likely availability of the other users of the other devices that are subscribers to the messaging service 62. That is, a user of a device 4, 104 having a client 60, 160 that is a subscriber to the messaging service 62 can receive enhanced data regarding the likely availability of the other subscribers to the messaging service 62 with which the user has already developed some type of electronic relationship. The data regarding availability can, for example, be in a stepped form that provides discrete levels of availability. Other formats for the availability data can be provided without departing from the concept of the invention.

For example, the stepped availability of a user of a device 4 can be represented by, for instance, a level from among a plurality of levels of availability and a plurality, for instance, of levels of nonavailability, depending upon the configuration of the device 4 and the client 60 thereon. The device 4 may, for instance, include a telephone capability, an e-mail capability, an organizer/calendar capability, a wireless point-to-point communication capability such as provided by the Bluetooth protocol or other protocol, an instant messaging capability, a push-to-talk communication capability, and/or many other capabilities. The detected degree of usage of the device 4 and/or of the various capabilities of the device 4 can be employed to generate the availability data which is reflective of an availability at any given time of a user of the device 4.

In the present exemplary embodiment 104, the availability data can be at any of six levels of availability, i.e., A(1), A(2), A(3), A(4), A(5), and A(6), with A(6) being the highest level of availability, or at any of three levels of nonavailability, i.e., and for example, "suspend", "unavailable", and "offline". Each such level can have a general description of the corresponding activity status on a device such as is provided in Table 1.

TABLE 1

| Availability Level | General Description of Activity Status |
| --- | --- |
| A(6) | Currently active on messaging application, i.e., client |
| A(5) | Currently actively using device |
| A(4) | Sporadically using device |
| A(3) | Less frequent device use |
| A(2) | Infrequent device use |
| A(1) | No recent device use |
| Suspend | On phone or on data call |
| Unavailable | Device unreachable (for instance, powered off or out of coverage) |
| Offline | Not logged into messaging service or client, or user is blocked. |

As a general matter, the "availability" of a user of a device 4 can be determined in a general fashion, or at least estimated, from the particular activity status of the device 4. For instance, if a user is actively using the messaging client 60 on the device 4, such as would correspond with the availability level A(6), the user likely is highly available to receive and respond to additional messages received through the messaging service 62 from other subscribers to the messaging service 62. Similarly, if the user has not used the device 4 for a predetermined period of time, such as might correspond with the availability level A(1), the user may be unlikely to respond to messages sent through the messaging service 62. If another subscriber is considering sending a message to the aforementioned user, the subscriber may consult the availability data provided to him regarding the user in order to gauge the likelihood that the user will be available for and be able to respond to a message through the messaging service 62. If the subscriber sees that the other user's availability is low, the subscriber may refrain from sending a message to the user on the assumption that the user would not respond to such a message. This would save the subscriber from wasted time and effort and would also save wasted usage of transmission bandwidth on the messaging service 62. The protocol described herein thus provides a plurality of levels of availability that are based at least in part upon the activity status of a device 4 and that provide to other subscribers an understanding of the potential for a user of the device 4 to respond to messages sent through the messaging service 62.

As suggested above, a plurality of nonavailability levels can be provided. The nonavailability level "suspend" might be used to refer to a situation in which a telephone event such as a telephone call is occurring on the device 4. In such a circumstance, the subscribers to the messaging service 62 would understand that the user of the device 4 on which the telephone event is occurring is temporarily not available but likely will be available as soon as the telephone call is ended. The nonavailability level "offline" might indicate to subscribers that the user of the device 4 has affirmatively terminated his or her availability, and that substantially no present possibility exists of the user receiving or responding to a message from a subscriber. The nonavailability level "unavailable" might indicate that the user of the device 4 is presently not available, but that the reason for such non-availability is not specifically known, and that the user potentially could become available again at any time. The protocol described herein thus also provides a plurality of descriptive levels of nonavailability that provide to other subscribers an understanding of the potential for an availability of a user of a device to go from nonavailable to available.

Numerous different activity statuses of the device 4 can be employed in determining an availability status for the device 4. Certain specific activities on the device 4 can trigger the generation of a specific availability level for transmission to the other subscribers to the messaging service 62. Certain other activities can cause the current availability level to be altered by a specific degree, i.e., by increasing or decreasing the current availability level to a predetermined extent. An exemplary set of activities on the device 4 and their corresponding exemplary results on the availability level of the device 4 are provided in Table 2. It is noted that a listed result such as "A(−1)" means that the current activity level is to be dropped by one level. A listed result such as "A(1)" means that the activity level is to be changed from whatever is its current value to a value of A(1). It is noted that Table 2 is not intended to be exhaustive, and that numerous other activities and other results can be provided.

TABLE 2

| Activity | Result on Availability Level |
| --- | --- |
| Device stays in holder for 10 minutes | A(−1) |
| Device stays in holder for 3 minutes with new messages not being read. | A(−1) |
| Profile changes from alert mode to quiet mode | A(−2) |
| Handheld receives a phone call | Suspend |
| Handheld places a phone call | Suspend |
| Compose an email to me | A(6) provided to me A(5) provided to everybody else |
| Compose an email to somebody else | A(5) |
| Compose an Instant message to me | A(6) |
| Compose an Instant Message to somebody else | A(6) |
| Turn off radio | Unavailable |
| Turn on radio | A(1) |
| Auto shut-off | Unavailable |
| Auto power on | A(1) |
| Manual power on | A(4) |
| Appointment in Calendar | A(−2) |
| Meeting in calendar (with other attendees) | A(−4) |
| Turn off cell phone | A(−4) |
| Send/receive a Data Call | Suspend for 5 minutes |
| Radio turned off due to | Unavailable |

TABLE 2-continued

| Activity | Result on Availability Level |
| --- | --- |
| low battery | |
| Read a received email, or SMS | A(+1), max A(5) |
| Read a received IM | A(6) |

From the activity in Table 2 "compose an email to me", it can be seen that the intended recipient of the email, i.e., "me", will receive an availability level of A(6) for the user composing the email, and the other subscribers will receive an availability level of A(5) for the user composing the email. This indicates that the availability level can be tailored to specific subscribers to the messaging service 62 in specific circumstances. It is understood that the designation "IM" employed in the instant application refers generally to the expression "instant message" and variations thereof, and is generally intended to refer to the messaging service 62 or to a data transmission provided on the messaging service 62, although the designation "IM" is not intended to limit the teachings herein strictly to an instant messaging environment, and the teachings rather can be applied in a variety of messaging environment.

Figure 4:
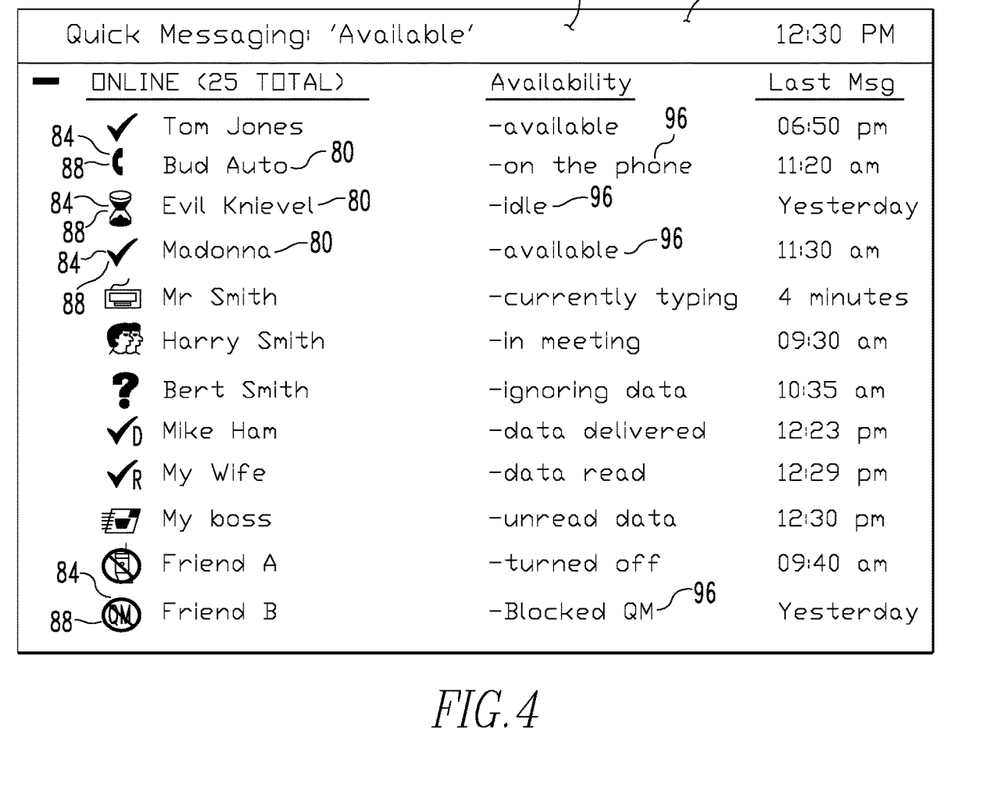
FIG. 4 is an exemplary view of an output provided in accordance with the method of the invention in the messaging environment.

As can be seen in FIG. 4, a subscriber to the messaging service 62 may see, for example, the output 78 provided by the user interface 76 on his device 104. For instance, the subscriber who is the user of the second device 104 may see the output 78, and the output 78 would include an indication of the various availability levels of the various other users with whom the user of the device 104 has already established an electronic relationship, such as the user of the first device 4. The exemplary output 78 includes a listing of contacts 80, i.e., the other subscribers with whom an electronic relationship has already been established, as well as an indication of the level of availability of each contact 80. In the present example, the indication of the level of availability is provided both by an availability icon 84 and by a string value 96. Each of the exemplary availability icons 84 in FIG. 4 is a descriptive icon 88, meaning that it provides a general depiction of the availability of the user as determined by the specific activity status on the corresponding device. The corresponding exemplary string value 96 is depicted herein as being a linguistic expression that corresponds generally with the descriptive icon 88 and with the activity status of the other user.

Figure 5:
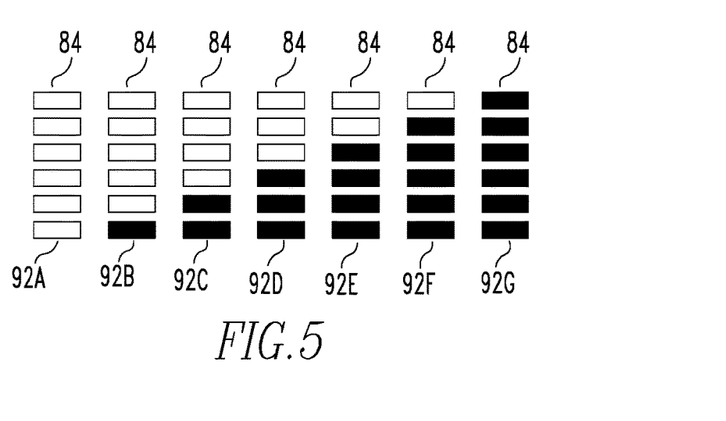
FIG. 5 is an exemplary view of an alternate icon that can be provided as part of the output.

The availability of the other subscribers can, however, be expressed in other fashions without departing from the concept of the invention. For instance, FIG. 5 depicts a plurality of availability icons 84 that are variable icons 92A, 92B, 92C, 92D, 92E, 92F, and 92G. The variable icons 92A, 92B, 92C, 92D, 92E, 92F, and 92G are depicted as each including a set of bars that either are filled in or are empty in a variable or graduated fashion depending upon the availability level. For instance, the variable icon 92A may correspond with activity level of nonavailable, the variable icon 92B may correspond with the activity level A(1), and so forth through the variable icon 92G which may correspond with the activity level A(6). Numerous other types of variable icons can be employed, such as icons that are lit at varying levels of brightness, that depict a water glass as gradually becoming more full with or less full of a liquid, and the like. Such variable icons 92A, 92B, 92C, 92D, 92E, 92F, and 92G can be employed, for instance, in the place of either or both of the descriptive icons 88 and the string values 96. It is noted that all of the availability icons 84 and string values 96 are stepped indications representative of predetermined stepped availability levels. Other ways of presenting availability information can be employed without departing from the concept of the invention.

As can be understood, the availability data may, for instance, be sent from one device to another at particular times, rather than being continuously updated. For instance, the availability data may be sent only after an expiration of a predetermined duration of time, such as ten minutes, for example. Such periodic transfer of availability data will save transmission bandwidth while providing availability data that is generally up to date. Alternative, or in addition thereto, the availability data concerning a device 4, 104 may be transmitted more or less immediately upon the occurrence of a predetermined event on the device 4, 104, such as the occurrence of a telephone event on the device 4, 104, or such as the occurrence of an event that would affect the wireless capability of the device 4, 104 such as from a powering off of the device 4, 104 or a logging out by the user from the client 60 or the messaging service 62.

The availability data provided by the protocol and method presented herein typically is generated and transmitted automatically, i.e., without a need for an affirmative action by the user to select an availability level or an activity status. This is particularly useful in the environment of a handheld electronic device 4, 104 because, for instance, a person receiving a telephone call on the handheld electronic device 4, 104 typically will be unable at that moment to manually change an availability level. Specifically, a person receiving a telephone call likely will want to accept the telephone call without manually changing an availability level.

It is also noted that the determination of an availability of a device 4, 104 can be incorporated with other data stored on the device 4, 104 or available to the device 4, 104. For instance, a device 4, 104 may include a calendar function that stores meetings and the like. Upon determining, for instance, that a meeting is scheduled to begin at a specific time, and upon detecting that the specific time has occurred, the device 4, 104 may generate a resultant availability level that is relatively low or is a level of unavailability based upon the user being in the scheduled meeting. The resultant availability level potentially could be tailored by the user depending upon, for instance, the importance of the meeting and/or the need to not be interrupted during the meeting. Other uses will be apparent.

The protocol described herein can be employed in various messaging environments, such as instant messaging environments and other messaging environments, as well as, for instance, messaging environments that employ or could usefully employ presence information and are generally available in a mixed environment of fixed and portable electronic devices. It is understood, however, that known messaging protocols and messaging services are not currently configured to provide for the transfer of enhancement data which would be representative of the availability of the various subscribers to the messaging services. In accordance with an aspect of the invention, the protocol described herein can be implemented, at least in part, on such preexisting messaging services 62.

As a general matter, enhancement data that is reflective of an availability of a user of a device can be provided between a pair of devices 4, 104 that are subscribers to a known messaging service 62 if the devices 4, 104 are in some fashion capable of sending and/or receiving availability data. Preexisting devices 4, 104 having preexisting clients that are subscribers to preexisting messaging services 62 generally do not have the capability to communicate such availability data; however, it is possible for a preexisting device 4, 104 to have or receive an upgraded client 60, 160, i.e., one that is capable of communication of availability data. Such an upgraded client 60, 160 can be provided in any of a variety of ways, such as by providing it in a download to the device, providing it on a machine readable medium, and in many other fashions. As a general matter, after an upgraded client 60, 160 is loaded onto a preexisting device 4, 104 on a preexisting messaging service 62, the upgraded client 60, 160 will begin to try to determine which of the other clients 60, 160 with which an electronic relationship has already been established are also upgraded clients 60, 160 capable of communication of availability data.

Figure 6:
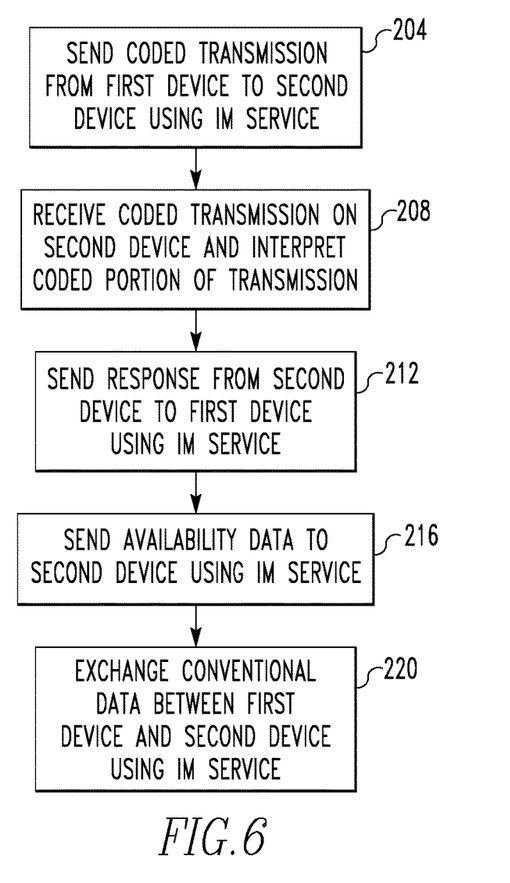
FIG. 6 is an exemplary flowchart of a portion of an improved method related to the devices of FIG. 3.
Figure 7:
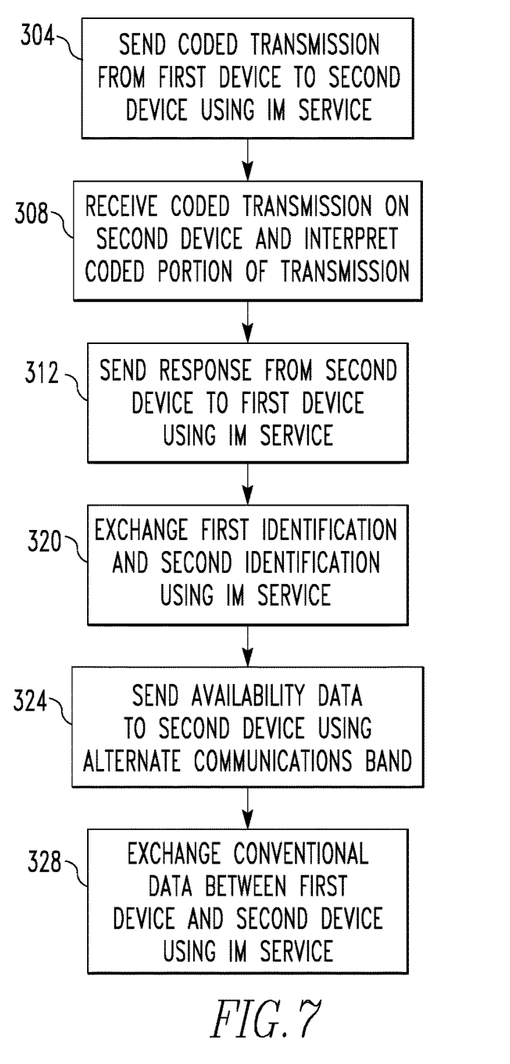
FIG. 7 is another exemplary flowchart of a portion of another improved method related to the device of FIG. 3.

FIGS. 6 and 7 depict flowcharts that set forth the exemplary ways in which the methods of providing availability data set forth herein can be implemented, i.e., bootstrapped, into a preexisting messaging service 62 which, by way of example herein, is an instant messaging service 62. A first method of providing the new protocol and methods described herein on a preexisting messaging service 62 is depicted in FIG. 6.

Once the upgraded client 60, 160 has been loaded onto a preexisting first device 4, such as was mentioned above, the upgraded client 60, 160 then sends a coded transmission, as at 204, via the preexisting messaging service 62 to a second preexisting device 104 having a client 60, 160 on the preexisting messaging service 62. In this regard, the message could be coded to include, for example, special characters or specially formatted white space, i.e., spaces and tabs, that can be transmitted over the communications band of the preexisting messaging service 62. The coding may be such that an upgraded client 60, 160, such as one capable of sending and/or receiving availability data, on the second device 104 would recognize the coding as an invitation from the client 60, 160 on the first device 4 to enter into an electronic negotiation for the transmission of activity data between the first device 4 and the second device 104. The coding may also be such that a non-upgraded client 60, 160, such as one that is not capable of sending and/or receiving availability data, would simply ignore the coding.

In the present example, however, it is assumed that upon receiving the message on the second device 104, as at 208, the client 60, 160 thereon is an upgraded client 60, 160 that is capable of interpreting the coded portion of the message as an invitation from the first device 4 to enter into a negotiation with the first device 4. The client 60, 160 on the second device 104 then sends, as at 212, a response to the first device 4 using the preexisting messaging service 62 to indicate that the second device 104 includes a client 60. 160 capable of handling availability data, and the upgraded clients 60, 160 on the first and second devices 4 and 104 enter into a negotiation as to how availability data will be transmitted therebetween. For instance, the negotiation may determine that the availability data is to be sent over the preexisting messaging service 62 between the first and second devices 4 and 104 in a specific coded fashion or in any of a variety of other fashions.

The first device 4 then sends, as at 216, a signal representative of availability data over the preexisting messaging service 62 to the second device 104. The first and second devices 4 and 104 also exchange, as at 220, conventional data over the preexisting messaging service 62, if such a communication is desired. It thus can be seen that by enabling an upgraded client 60, 160 to use a preexisting messaging service 62 to locate other upgraded clients 60, 160, the upgraded clients 60, 160 can exchange availability data over the preexisting messaging service 62 in addition to exchanging conventional data such as messages over the same preexisting messaging service 62.

Another method of providing the new protocol described herein on a preexisting messaging service 62 is depicted in FIG. 7. The method of FIG. 7 is similar to the method of FIG. 6, except that the availability data is shown in FIG. 7 as being communicated between the first and second devices 4 and 104 via an alternate communications band 72 (FIG. 3), which can be any communications band other than the communications band of the preexisting messaging service 62.

Specifically, a coded transmission is sent, as at 304, via the preexisting message service 62 from the upgraded client on the first device 4 to the upgraded client 60, 160 on the second device 104. The coded transmission is received on the second device 104, as at 308, and is interpreted by the upgraded client 60, 160 thereon. The second device 104 then sends, as at 312, a response via the preexisting message service to the first device 4 requesting a negotiation.

At 320, however, the first device 4 and the second device 104 exchange alternate identifications for the purpose of identifying an alternate communications band 72 and for identifying the first device 4 and the second device 104 on the alternate communications band 72. Specifically, the first device 4 transmits one or more first identifications to the second device 104, and the second device 104 transmits one or more second identifications to the first device 4. The first and second identifications can be, for example, telephone numbers, IP addresses, PINs, e-mail address, instant messaging user-IDs, and the like that would identify the first device 4 and the second device 104, respectively, on another network such as a telephone network, a global communications network, private or public messaging network, or other network on an alternate communications band 72 on which the first device 4 and the second device 104 are capable of communication with one another.

Upon performing the negotiation, in which an alternate communications band 72 is selected between the first and second devices 4 and 104, the availability data is sent, as at 324, between the first and second devices 4 and 104 over the alternate communications band. Conventional data can then be exchanged, as at 328, over the preexisting messaging service if such communication of data, such as a message, is desired.

The protocol and methods of exchanging availability data set forth herein thus advantageously can be implemented onto a preexisting messaging services 62. As set forth above, the availability data can be sent periodically, such as upon the occurrence of a predetermined event or an expiration of a predetermined duration of time, or otherwise. Of course, a new messaging service 62 could be established that provides the protocol herein for the communication of availability data between devices.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A non-transitory computer readable medium comprising wireless device processor executable instructions, which when executed by a wireless device processor effects a messaging service client, the messaging service client being configured to selectively transmit messages to a plurality of associated messaging clients via a messaging service and receive messages from the plurality of associated messaging clients via the messaging service, the instructions comprising instructions for:

displaying an indicator of a delivery status of a message transmitted to at least one of the associated messaging clients;

displaying an indicator of a read status of the message transmitted to the at least one of the associated messaging clients; and     displaying an indicator of an activity status of the at least one of the associated messaging clients, wherein the indicator of the activity status indicates that the at least one of the associated messaging clients is currently active or a representation of time since the at least one of the associated messaging clients has sent a message.

2. The non-transitory computer readable medium of claim 1, wherein the indicator of the delivery status includes a check mark.

3. The non-transitory computer readable medium of claim 1, wherein the indicator of the activity status indicates whether a user of the at least one of the associated messaging clients is typing.

4. The non-transitory computer readable medium of claim 1, wherein the indicator of the activity status corresponds to a user selectable status.

5. The non-transitory computer readable medium of claim 1, wherein the indicator of the activity status includes the word typing.

6. The non-transitory computer readable medium of claim 1, further comprising instructions for subscribing to the messaging service.

7. The non-transitory computer readable medium of claim 1, wherein the indicator of the read status is provided in response to receipt of data received from the at least one of the associated messaging clients.

8. The non-transitory computer readable medium of claim 1, wherein a user of the messaging service client and a user of the at least one of the associated messaging clients are subscribers of the messaging service.

9. The non-transitory computer readable medium of claim 1, wherein delivery status data is received from a server of the messaging service.

10. A non-transitory computer readable medium comprising wireless device processor executable instructions, which when executed by a wireless device processor effects a messaging service client, wherein the messaging service client selectively transmits messages to a plurality of associated messaging clients via a messaging service, the instructions comprising instructions for:

displaying a first indicator of a first delivery status of a first message transmitted to a first associated messaging client;

displaying a second indicator of a second delivery status of a second message transmitted to a second associated messaging client;

displaying a first indicator of a first activity status of the first associated messaging client, wherein the first indicator of the first activity status indicates that the first associated messaging client is currently active or a representation of time since the first associated messaging client has sent a message; and     displaying a second indicator of a second activity status of the second associated messaging client.

11. The non-transitory computer readable medium of claim 10, wherein the first indicator of the first delivery status and the second indicator of the second delivery status are both displayed on a same screen.

12. The non-transitory computer readable medium of claim 10, wherein the first indicator of the first activity status is displayed in conjunction with information identifying a user of the first associated messaging client.

13. A non-transitory computer readable medium comprising wireless device processor executable instructions, which when executed by a wireless device processor effects a messaging service client, wherein the messaging service client selectively transmits messages to a plurality of associated messaging clients via a messaging service, the instructions comprising instructions for:

displaying information identifying a plurality of users corresponding to a plurality of the associated messaging clients, wherein the plurality of users are identified by determining which of the plurality of users are in an existing listing of contacts and are subscribers to the messaging service;

displaying an indicator of a delivery status of a message transmitted to at least one of the associated messaging clients; and     displaying an indicator of an activity status of a user of the at least one of the associated messaging clients, wherein the indicator of the activity status indicates that the at least one of the associated messaging clients is currently active or a representation of time since the at least one of the associated messaging clients has sent a message.

14. The non-transitory computer readable medium of claim 13 further comprising instructions for determining the plurality of users.

15. The non-transitory computer readable medium of claim 13, wherein the plurality of users corresponding to the plurality of the associated messaging clients are determined automatically after the messaging service client is installed on the wireless device.

16. A method, comprising:

displaying, at a wireless device comprising a messaging service client that selectively transmits messages to a plurality of associated messaging clients via a messaging service and that receives messages from the plurality of associated messaging clients via the messaging service, an indicator of a delivery status of a message transmitted to at least one of the associated messaging clients;

displaying, at the wireless device, an indicator of a read status of the message transmitted to the at least one of the associated messaging clients; and     displaying, at the wireless device, an indicator of an activity status of the at least one of the associated messaging clients, wherein the indicator of the activity status indicates that the at least one of the associated messaging clients is currently active or a representation of time since the at least one of the associated messaging clients has sent a message.

17. The method of claim 16, wherein the indicator of the delivery status includes a check mark.

18. The method of claim 16, wherein the indicator of the activity status indicates whether a user of the at least one of the associated messaging clients is typing.

19. The method of claim 16, wherein the indicator of the activity status corresponds to a user selectable status.

20. The method of claim 16, wherein the indicator of the activity status includes the word typing.

21. The method of claim 16, further comprising subscribing to the messaging service.

22. The method of claim 16, wherein the indicator of the read status is provided in response to receipt of data received from the at least one of the associated messaging clients.

23. The method of claim 16, wherein a user of the messaging service client and a user of the at least one of the associated messaging clients are subscribers of the messaging service.

24. The method of claim 16, wherein delivery status data is received from a server of the messaging service.

25. A method, comprising:
displaying, at a wireless device comprising a messaging service client that selectively transmits messages to a plurality of associated messaging clients via a messaging service and that receives messages from the plurality of associated messaging clients via the messaging service, a first indicator of a first delivery status of a first message transmitted to a first associated messaging client;
displaying, at the wireless device, a second indicator of a second delivery status of a second message transmitted to a second associated messaging client;
displaying, at the wireless device, a first indicator of a first activity status of the first associated messaging client, wherein the first indicator of the first activity status indicates that the first associated messaging client is currently active or a representation of time since the first associated messaging client has sent a message; and
displaying, at the wireless device, a second indicator of a second activity status of the second associated messaging client.

26. The method of claim 25, wherein the first indicator of the first delivery status and the second indicator of the second delivery status are both displayed on a same screen.

27. The method of claim 25, wherein the first indicator of the first activity status is displayed in conjunction with information identifying a user of the first associated messaging client.

28. A method, comprising:
displaying, at a wireless device comprising a messaging service client that selectively transmits messages to a plurality of associated messaging clients via a messaging service, information identifying a plurality of users corresponding to a plurality of the associated messaging clients, wherein the plurality of users are identified by determining which of the plurality of users are in an existing listing of contacts and are subscribers to the messaging service;
displaying, at the wireless device, an indicator of a delivery status of a message transmitted to at least one of the associated messaging clients; and
displaying, at the wireless device, an indicator of an activity status of a user of the at least one of the associated messaging clients, wherein the indicator of the activity status indicates that the at least one of the associated messaging clients is currently active or a representation of time since the at least one of the associated messaging clients has sent a message.

29. The method of claim 28, further comprising determining the plurality of users.

30. The method of claim 29, wherein the plurality of users corresponding to the plurality of the associated messaging clients are determined automatically after the messaging service client is installed on the wireless device.

31. A wireless device, comprising:
at least one hardware processor;
one or more non-transitory computer-readable storage medium coupled to the at least one hardware processor and storing programming instructions for execution by the at least one hardware processor, wherein the programming instructions, when executed, cause the wireless device to perform operations comprising:
selectively transmitting, using a messaging service client, messages to a plurality of associated messaging clients via a messaging service;
displaying an indicator of a delivery status of a message transmitted to at least one of the associated messaging clients;
displaying an indicator of a read status of the message transmitted to the at least one of the associated messaging clients; and
displaying an indicator of an activity status of the at least one of the associated messaging clients, wherein the indicator of the activity status indicates that the at least one of the associated messaging clients is currently active or a representation of time since the at least one of the associated messaging clients has sent a message.

32. The wireless device of claim 31, wherein the indicator of the delivery status includes a check mark.

33. The wireless device of claim 31, wherein the indicator of the activity status indicates whether a user of the at least one of the associated messaging clients is typing.

34. The wireless device of claim 31, wherein the indicator of the activity status corresponds to a user selectable status.

35. The wireless device of claim 31, wherein the indicator of the activity status includes the word typing.

36. The wireless device of claim 31, the operations further comprising subscribing to the messaging service.

37. The wireless device of claim 31, wherein the indicator of the read status is provided in response to receipt of data received from the at least one of the associated messaging clients.

38. The wireless device of claim 31, wherein a user of the messaging service client and a user of the at least one of the associated messaging clients are subscribers of the messaging service.

39. The wireless device of claim 31, wherein delivery status data is received from a server of the messaging service.

40. A wireless device, comprising:
at least one hardware processor;
one or more non-transitory computer-readable storage medium coupled to the at least one hardware processor and storing programming instructions for execution by the at least one hardware processor, wherein the programming instructions, when executed, cause the wireless device to perform operations comprising:
selectively transmitting, using a messaging service client, messages to a plurality of associated messaging clients via a messaging service;
displaying a first indicator of a first delivery status of a first message transmitted to a first associated messaging client;
displaying a second indicator of a second delivery status of a second message transmitted to a second associated messaging client;
displaying a first indicator of a first activity status of the first associated messaging client, wherein the first indicator of the first activity status indicates that the first associated messaging client is currently active or a representation of time since the first associated messaging client has sent a message; and displaying, at the wireless device, a second indicator of a second activity status of the second associated messaging client.

41. The wireless device of claim 40, wherein the first indicator of the first delivery status and the second indicator of the second delivery status are both displayed on a same screen.

42. The wireless device of claim 40, wherein the first indicator of the first activity status is displayed in conjunction with information identifying a user of the first associated messaging client.

43. A wireless device, comprising:
at least one hardware processor;
one or more non-transitory computer-readable storage medium coupled to the at least one hardware processor and storing programming instructions for execution by the at least one hardware processor, wherein the programming instructions, when executed, cause the wireless device to perform operations comprising:
selectively transmitting, using a messaging service client, messages to a plurality of associated messaging clients via a messaging service;
displaying information identifying a plurality of users corresponding to a plurality of the associated messaging clients, wherein the plurality of users are identified by determining which of the plurality of users are in an existing listing of contacts and are subscribers to the messaging service;
displaying an indicator of a delivery status of a message transmitted to at least one of the associated messaging clients; and
displaying an indicator of an activity status of a user of the at least one of the associated messaging clients, wherein the indicator of the activity status indicates that the at least one of the associated messaging clients is currently active or a representation of time since the at least one of the associated messaging clients has sent a message.

44. The wireless device of claim 43, the operations further comprising determining the plurality of users.

45. The wireless device of claim 43, wherein the plurality of users corresponding to the plurality of the associated messaging clients are determined automatically after the messaging service client is installed on the wireless device.

* * * * *

UNITED STATES PATENT AND TRADEMARK OFFICE
CERTIFICATE OF CORRECTION

PATENT NO. : 11,175,794 B2
APPLICATION NO. : 16/882172
DATED : November 16, 2021
INVENTOR(S) : Craig Dunk et al.

It is certified that error appears in the above-identified patent and that said Letters Patent is hereby corrected as shown below:

On the Title Page

Item [63], Column 1, (Related U.S. Application Data), Line 1-2, (First Page), Line 1-6, (Page 2), delete "Continuation of application No. 16/882,172, filed on Apr. 10, 2019, now Pat. No. 10,664,130, which is a continuation of application No. 16/380,528, filed on Jan. 20, 2014, now Pat. No. 10,261,654, which is a continuation of application No. 14/159,170, filed on Dec. 21, 2007, now Pat. No. 9,098,169, which is a continuation-in-part of application No. 11/962,145, filed on Sep. 16, 2004, now Pat. No. 7,315,747." and insert -- Continuation of application No. 16/380,528, filed on Apr. 10, 2019, now Pat. No. 10,664,130, which is a continuation of application No. 14/159,170, filed on Jan. 20, 2014, now Pat. No. 10,261,654, which is a continuation of application No. 11/962,145, filed on Dec. 21, 2007, now Pat. No. 9,098,169, which is a continuation-in-part of application No. 10/942,305, filed on Sep. 16, 2004, now Pat. No. 7,315,747. --, therefor.

In the Claims

In Column 13, Line 62, In Claim 30, delete "claim 29," and insert -- claim 28, --, therefor.

Signed and Sealed this
Third Day of May, 2022

Katherine Kelly Vidal
*Director of the United States Patent and Trademark Office*